(12) United States Patent
Paulin et al.

(10) Patent No.: US 8,656,265 B1
(45) Date of Patent: Feb. 18, 2014

(54) LOW-LATENCY TRANSITION INTO EMBEDDED WEB VIEW

(71) Applicant: Google Inc., Mountain View, CA (US)

(72) Inventors: Alan Paulin, Kitchener (CA); Ilia Tulchinksy, Maple (CA); Charles Laurence Stinson, Nussussayga (CA); Andrew Wahbe, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/759,216

(22) Filed: Feb. 5, 2013

Related U.S. Application Data (63) Continuation of application No. 13/610,429, filed on Sep. 11, 2012.

(51) Int. Cl.
*G06F 17/00* (2006.01)

(52) U.S. Cl.
USPC ........................................................ 715/205

(58) Field of Classification Search
USPC .................................. 715/205, 200, 274, 273
See application file for complete search history.

(56) References Cited

U.S. PATENT DOCUMENTS

| | | | |
|---|---|---|---|
| 7,152,203 B2 * | 12/2006 | Gao et al. ....................... | 715/240 |
| 7,487,185 B2 * | 2/2009 | Lomelin-Stoupignan et al. ... | 1/1 |
| 7,836,261 B2 * | 11/2010 | Keohane et al. ............... | 711/139 |
| 8,041,705 B2 * | 10/2011 | Balasubramanian et al. | 707/709 |
| 8,156,141 B1 * | 4/2012 | Shmulevich et al. .......... | 707/770 |
| 8,407,598 B2 * | 3/2013 | Burton ........................... | 715/736 |
| 2001/0037359 A1 * | 11/2001 | Mockett et al. ................ | 709/203 |
| 2002/0032701 A1 * | 3/2002 | Gao et al. ....................... | 707/513 |
| 2002/0188635 A1 * | 12/2002 | Larson ........................... | 707/515 |
| 2005/0022120 A1 * | 1/2005 | Takahashi ...................... | 715/522 |
| 2005/0235203 A1 * | 10/2005 | Undasan ........................ | 715/526 |
| 2006/0242569 A1 * | 10/2006 | Grigoriadis et al. ........... | 715/517 |
| 2007/0089058 A1 * | 4/2007 | Dias et al. ...................... | 715/716 |
| 2007/0136318 A1 * | 6/2007 | Clark et al. .................... | 707/100 |
| 2007/0294333 A1 | 12/2007 | Yang et al. | |
| 2009/0265626 A1 * | 10/2009 | Suga .............................. | 715/274 |
| 2010/0095067 A1 * | 4/2010 | Kosaraju et al. .............. | 711/126 |
| 2010/0095197 A1 * | 4/2010 | Klevenz et al. ................ | 715/234 |
| 2010/0107064 A1 * | 4/2010 | Yamaguchi et al. ........... | 715/274 |
| 2010/0235737 A1 * | 9/2010 | Koh .............................. | 715/704 |

(Continued)

OTHER PUBLICATIONS

Li et al., Freshness-driven Adaptive Caching for Dynamic Content Web sites, Goggle 2003, pp. 269-296.*

(Continued)

*Primary Examiner* — Cong-Lac Huynh
(74) *Attorney, Agent, or Firm* — McDonnell Boehnen Hulbert & Berghoff LLP (57) ABSTRACT

To help reduce latency when an application presents an embedded web view, the application may provide to a web view controller not only a base uniform resource indicator of a web application defining the web view but also preview data for the web view controller to render for presentation together with a cached version of the web view. In accordance with script logic defined by the web application, the web view controller may then (i) incorporate the provided preview data into the cached version of the web view and render the result as a preview view for presentation at a user interface, (ii) download instance data for the web view while the preview view is presented, and (iii) upon receipt of the instance data, establish and render a full version of the web view based on the instance data, for presentation at the user interface.

30 Claims, 8 Drawing Sheets

(56) References Cited

U.S. PATENT DOCUMENTS

| | | | |
|---|---|---|---|
| 2011/0022559 A1* | 1/2011 | Andersen et al. | 706/47 |
| 2011/0066733 A1* | 3/2011 | Hashimoto et al. | 709/227 |
| 2011/0093790 A1* | 4/2011 | Maczuba | 715/745 |
| 2011/0145698 A1* | 6/2011 | Penov et al. | 715/235 |
| 2012/0017284 A1* | 1/2012 | Kim et al. | 726/26 |
| 2012/0084644 A1* | 4/2012 | Robert et al. | 715/255 |
| 2012/0233528 A1* | 9/2012 | Holt et al. | 715/205 |
| 2012/0246566 A1* | 9/2012 | Shiraga | 715/274 |
| 2012/0316984 A1* | 12/2012 | Glassman | 705/26.7 |
| 2012/0324352 A1* | 12/2012 | Igawa | 715/274 |
| 2012/0324556 A1* | 12/2012 | Yefimov et al. | 726/7 |
| 2013/0007575 A1* | 1/2013 | Bacus et al. | 715/202 |
| 2013/0067354 A1* | 3/2013 | O'Shaugnessy et al. | 715/752 |
| 2013/0074131 A1* | 3/2013 | Cerveau et al. | 725/88 |
| 2013/0163873 A1* | 6/2013 | Qingjie et al. | 382/176 |
| 2013/0226992 A1* | 8/2013 | Bapst et al. | 709/203 |

OTHER PUBLICATIONS

Guinard et al., A Resource Oriented Architecture for the Web of Things, IEEE 2010, pp. 1-8.*

"Fragment identifier," from Wikipedia, printed from the World Wide Web on Jun. 21, 2012.

"Web application/Progressive loading," from DocForge, printed from the World Wide Web on Jun. 21, 2012.

"Prerendering in Chrome," Chromium Blog, dated Jun. 14, 2011.

* cited by examiner

LOW-LATENCY TRANSITION INTO EMBEDDED WEB VIEW

REFERENCE TO RELATED APPLICATION

This is a continuation of U.S. patent application Ser. No. 13/610,429, filed Sep. 11, 2012, the entirety of which is hereby incorporated by reference.

BACKGROUND

Unless otherwise indicated herein, the information described in this section is not admitted to be prior art by inclusion in this section.

In general, an application running on a computing device may be defined by one or more locally stored code modules that are executable by a processing unit to carry out particular functions, such as to present application content in various pages or "views" at a user interface and to enable a user of the device to navigate from one such view to another. In practice, such an application may programmatically define and/or locally store each view in whole or in part. Consequently, as the user navigates from one view to another during execution of the application, the processing unit may readily transition between the views, providing a seamless user experience.

From an application developer standpoint, however, one problem with such applications is they tend to have relatively long update-release cycles. In particular, once an application has been installed on a computing device, if a developer updates the application, it may take on the order of weeks for that update to reach the device. A reason for this delay is that application updates are often distributed through online application stores that impose time-consuming certification processes before allowing publication of updates. Further, even after an update has been published, it may be quite some time before a user's computing device checks for, downloads, and installs the update, or the user may choose to not install the update.

When developing an application, one way to help avoid or minimize this delay problem is to incorporate into the application one or more embedded web views. In particular, the developer may programmatically incorporate into the application a web view controller that is arranged to download and render web pages in much the same way that a conventional web browser does. By invoking the web view controller, the application may therefore present application content in one or more web pages rather than presenting that content in one or more native application views. Conveniently with this arrangement, the developer may then quickly update an application installed on a computing device by simply changing one or more web pages or associated objects on a web server and causing the web view controller to download the updated web pages or objects. Advantageously, the update-release cycle for such pages can thus be on the order of mere minutes, rather than weeks.

Unfortunately, however, application developers may tend to avoid using embedded web views like this, because of difficulty in making the user experience as good as with a purely native application. One issue with use of embedded web views, for instance, is that when a native application calls a web view controller to present a web page, there could be a significant delay as the web view controller then works to download and render the web page. This is especially the case with mobile wireless devices, such as cellular phones or tablet computers for instance, due to latency in wireless communications. Further, even if the web view controller had previously cached a copy of the web page in local data storage, the web view controller may still need to download particular instance data, such as relevant images or other information, to render as part of the web page for presentation to the user.

From a user perspective, this delay in loading web views may be troubling, especially if the application also presents some native application views, since the application may quickly transition to present the native application views but may then seem sluggish as it transitions to present a web view. Furthermore, as an application transitions between native views and web views, the user might not know that some views are native views and others are web views. Therefore, the user may not understand why there is an inconsistency in the speed of transition to various views of the application. Overall, this inconsistency and delay may provide for a poor user experience. Consequently, an improvement is desired.

SUMMARY

In one aspect, disclosed herein is a non-transitory computer readable medium having stored thereon a native application executable by a processing unit to carry out various functions. The functions may include caching a web page in data storage of a computing device. Further, the functions may include causing the computing device to present a native application view at a user interface. Further, the functions may include calling a web view controller while the computing device is presenting the native application view at the user interface. In particular, calling the web view controller may include passing to the web view controller a uniform resource identifier (URI) of the web page to cause the web view controller to retrieve the web page from the data storage and to render the retrieved web page for presentation at the user interface. Moreover, the functions may include providing preview data to the web view controller when calling the web view controller, for incorporation of the preview data in the presentation of the web page at the user interface.

In this arrangement, the web page may include script logic that is executable by the processing unit (i) to incorporate the provided preview data into the presentation of the web page at the user interface, (ii) to download, via a network interface of the computing device, instance data for the web page, while the web page with the incorporated preview data is presented at the user interface, and (iii) upon download of the instance data, to incorporate the instance data into the presentation of the web page at the user interface.

In another aspect, disclosed herein is a non-transitory computer readable medium having stored thereon a first application (e.g., a native application) and a second application (e.g., an embedded web application, such as a web view with associated logic). The first application may be executable by a processing unit to invoke the second application and, when invoking the second application, to provide the second application with preview content.

Further, the second application may define an application view (e.g., a web page) renderable by the processing unit for presentation at a user interface and may further define script logic executable by the processing unit (i) to receive the preview content provided by the first application when invoking the second application, (ii) to incorporate the preview content into the application view to produce a preview view renderable by the processing unit for presentation at the user interface, (iii) to download instance data via a network from a network server while the preview view is being presented at the user interface, and (iv) upon receipt of the downloaded instance data, to establish, based on the instance data, an updated view renderable by the processing unit for presentation at the user interface.

In still another aspect, disclosed herein is a computing device that includes (a) a network interface for communicating data to and from the computing device, (b) a processing unit, (c) a user interface, (d) data storage, (e) a web application that is cached in the data storage and that defines a web page structure renderable by the processing unit for presentation at the user interface, and (f) an invoking application stored in the data storage and executable by the processing unit to invoke the web application and, when invoking the web application, to provide preview content to the web application.

In this arrangement, the web application may further define script logic executable by the processing unit upon the invocation of the web application (i) to receive the preview content provided by the invoking application, (ii) to incorporate the received preview content into the cached web page structure so as to establish a preview page renderable by the processing unit for presentation at the user interface, (iii) to download, via the network interface, instance content for the web application while the preview page is being presented at the user interface, and (iv) upon receipt of the downloaded instance data, to establish, based on the instance data, an updated page renderable by the processing unit for presentation at the user interface.

Yet further, in another aspect, disclosed herein is a method for managing presentation of views at a user interface of a computing device. The method may include caching a web page in data storage of a computing device, where the web page defines a presentation structure and script logic. Further, the method may include a processing unit calling a web view control module to trigger presentation of the web page, where calling the web view control module includes passing to the web view control module a URI of the web page, to cause the web view control module to retrieve the web page from the data storage and to render the retrieved web page for presentation at a user interface of the computing device.

Still further, the method may include providing preview data to the web view control module when calling the web view control module, for incorporation of the preview data in the presentation of the web page at the user interface. And the method may include the processing unit executing the script logic in the web page (i) to incorporate the provided preview data into the presentation of the web page at the user interface, (ii) to download, via a network interface of the computing device, instance data for the web page, while the web page with the incorporated preview data is presented at the user interface, and (iii) upon download of the instance data, to incorporate the instance data into the presentation of the web page at the user interface.

These, as well as other aspects, advantages, and alternatives will become more apparent to those of ordinary skill in the art by reading the following detailed description, with reference where appropriate to the accompanying drawings. Further, it should be understood that the description provided in this summary section and elsewhere in this document is intended to describe the method and apparatus by example only and not by way of limitation.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

As noted above, a potential issue with use of embedded web views in an application installed on a computing device is that there may be significant delay in loading the web views, especially as compared with the speed of loading native application views. In accordance with the present disclosure, one way to help improve the user experience with embedded web views is to have the application provide the web view controller with preview data to be incorporated into a cached version of the web view, so that the web view controller can render the web view incorporating that preview data while the web view controller works to download instance data to then be incorporated into the web view.

Advantageously with this process, the user may thus perceive the application quickly transitioning to a preview view that incorporates the preview data, and the user may then perceive the application transitioning from that preview view to a full view that incorporates the instance data. Furthermore, using an advanced web technology such as AJAX (asynchronous JavaScript and XML), the transition from the preview view to the full view could appear essentially seamless. From the user perspective, the application would thus provide a fairly smooth transition by presenting an intermediate, preview view while the application transitions to present a more full view.

Note that this process differs from mere progressive loading of a web page and from passing of query parameters to a web server. With progressive loading, when a web browser (or a web view controller for that matter) seeks to load a web page, the web browser may load a portion of the web page from a web server or from a local cache and may render that portion for presentation at a user interface while downloading one or more additional portions of the page to add to the rendered presentation. Further, if the URI of a web page includes one or more query parameters, the browser may transmit those query parameters to a web server to enable the web server to return a web page customized based the query parameters. With the present process, however, when a native application calls an embedded web view controller and passes to the web view controller the URI of a web page to be presented, the native application may further provide the web view controller with preview data for the web view controller to incorporate into a cached version of the web view. The web view controller may thus quickly incorporate the provided preview data into the cached web view and render the result as a preview view, without delaying the process by seeking to acquire any portion of the preview view from a web server.

Figure 1:
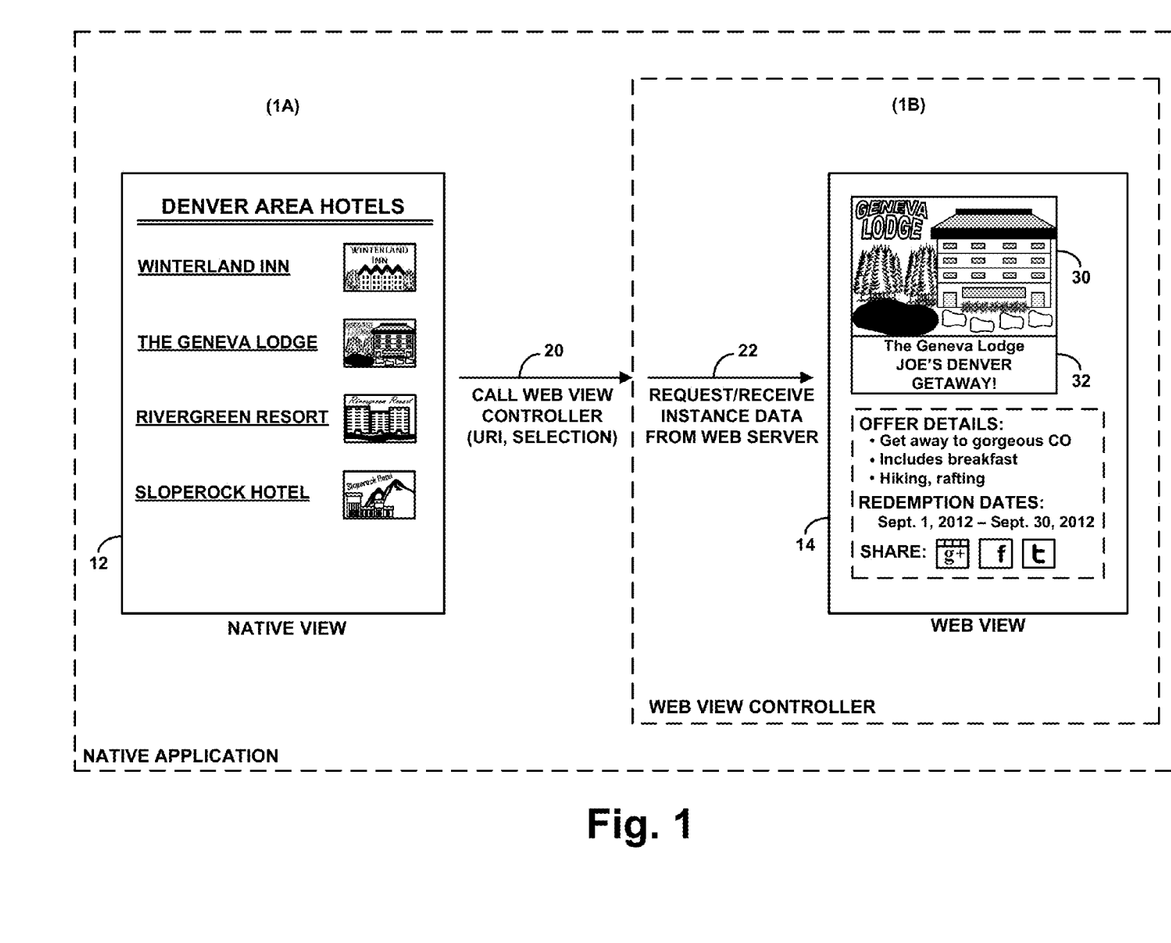
FIG. 1 is an illustration of an example transition from a native application view to an embedded web view.
Figure 2:
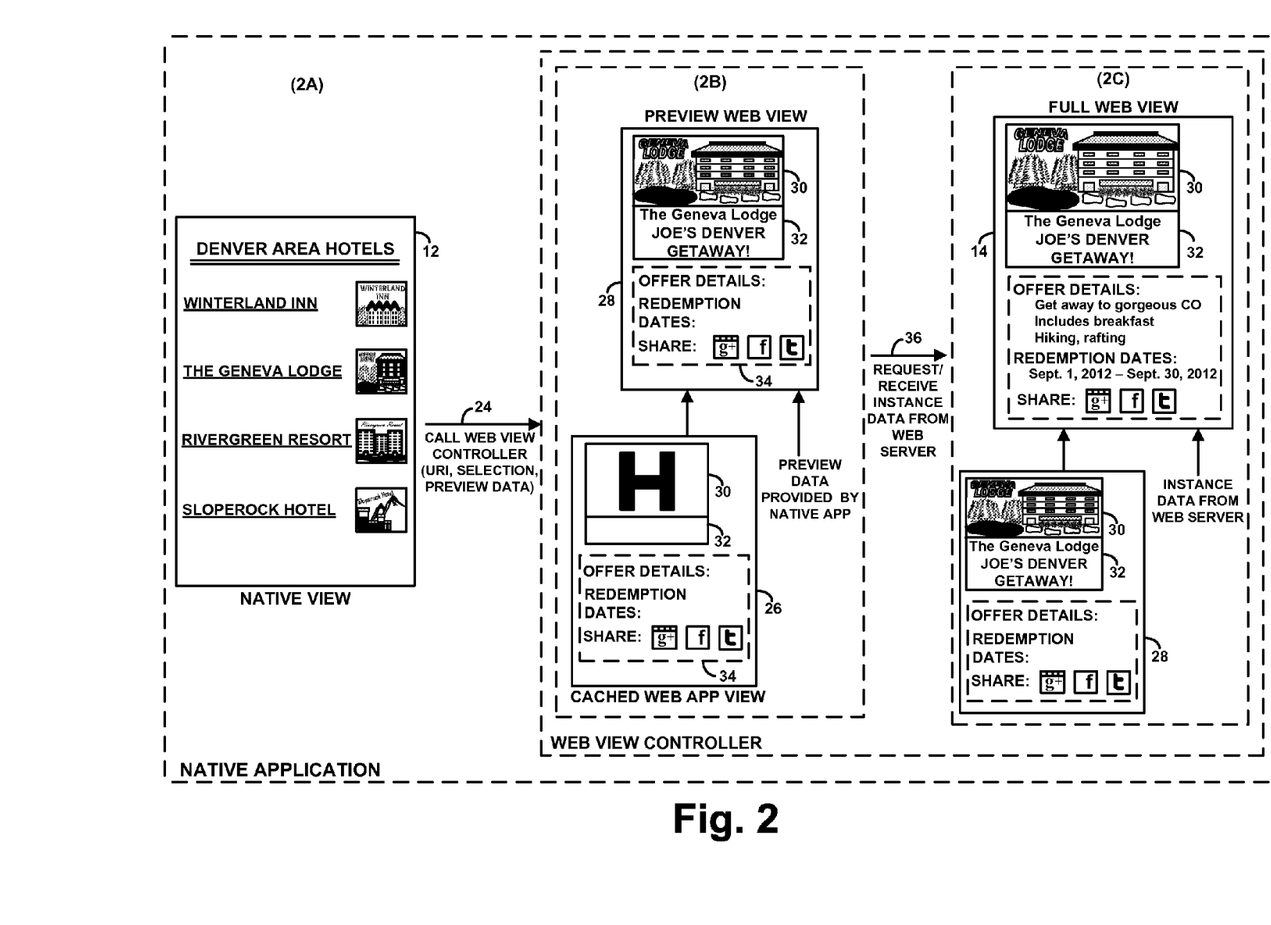
FIG. 2 is an illustration of an example transition from a native application view to a preview web view to a full web view.

FIGS. 1 and 2 depict an example of how this process may work in practice. In particular, the figures assume that a native application installed on a computing device provides various views, including at least one native view 12 and at least one 14 web view, through which a user can shop for hotel accommodations. FIG. 1 generally depicts the application transitioning from the native application view 12 to the web view 14, and FIG. 2 then illustrates how the present method may help to render that transition more seamless and thereby provide an improved user experience.

As shown in FIG. 1, at step 1A, the example application provides at a user interface a native view 12, which presents the user with a list of Denver area hotels for which the application may provide special offers. In practice, the native application may have generated this list after the user navigated through other native application views (not shown) to search for hotel deals, and then specifically hotel deals in the Denver area. In line with the discussion above, the application may programmatically define or have locally stored this native view 12 as an integral part of the application, to facilitate quickly transitioning to present this native view. Alternatively or additionally, the application may have engaged in web communication (e.g., Hypertext Transfer Protocol (HTTP) communication) with one or more servers to obtain some or all of the hotel information. In the native view shown, each hotel is listed with a name and an accompanying thumbnail image, both of which may be actionable links or buttons that the user can select (e.g., click, touch, etc.) in order to request more information about the hotel.

Once the user selects a desired hotel from the example native view, the application may respond by programmatically calling an embedded web view controller, to cause the web view controller to download from a web server a web page that provides an offer details for that hotel, as web view 14. In particular, as shown by arrow 20, the application may call the web view controller, passing to the web view controller a URI of the desired web view, and including in the URI one or more query parameters that indicate the user's hotel selection. In turn, as shown by arrow 22, the web view controller may then transmit the URI in an HTTP request (e.g., a GET request) to a web server, and the server may look up details about the selected hotel and return to the web view controller a Hypertext Markup Language (HTML) document that the web view controller may then render as web view 14 at step 1B.

As discussed above, this process of transitioning to present a web view may take quite some time as the web view controller waits for a response to its HTTP request, and this delay may result in a poor user experience, especially if the application has previously transitioned more quickly to present one or more native views.

Turning next to FIG. 2, the present method can help to make this process more seamless by having the application provide the web view controller with preview data for the web view controller to incorporate into a cached version of the web view that the web view controller may then render as a preview view while the web view controller works to establish and present the full version of the web view.

As shown in FIG. 2, at step 2A, the application similarly provides example native view 12, presenting a list of hotels selectable by the user. In this case, however, when the user selects a hotel and the application calls an embedded web view controller to present a web view that provides details about the selected hotel, the application may advantageously provide the web view controller not only with a URI as discussed above but also with preview data that the web view controller may incorporate into a cached version of the web view so as to establish and render a preview view of the web view. The web view controller may then present that preview view while the web view controller works to download the instance data as discussed above and to then present the full web view.

More particularly, as shown by arrow 24 in FIG. 2, when the user selects a hotel from the native view 12, the application may call the embedded web view controller, passing to web view controller a URI of the desired web view (e.g., a URI that the native application associates with presentation of hotel details) and including in the URI one or more query parameters that indicate the user's selected hotel, and further providing to the web view controller preview data for incorporation in a preview view of the web view.

The preview data that the application provides to the web view controller may take any of a variety of forms, optimally serving the purpose of allowing the preview view to convey transitional meaning to the user. By way of example, if the application has access to user profile information indicating the user's name (e.g., through an operating system API or other configuration data), and if the application has the name, location, and image of the selected hotel (e.g., as part of the data underlying the native view 12), the preview data could be some useful combination of that information. For instance, if the user's name is Joe and the selected hotel is The Geneva Lodge, the preview data could be an image of The Geneva Lodge and the text "The Geneva Lodge—Joe's Denver getaway!" Alternatively, in that example, the preview data could simply be "Joe" and the hotel image, or perhaps simply "Joe", leaving the web view controller to supplement the preview data with other text if desirable. Numerous other examples are possible as well.

Further, the application may provide this preview data to the web view controller in various ways when calling the web view controller. By way of example, the application may include the preview data in hash fragment of the URI that the application passes to the web view controller (typically at the end of the URI, prefaced by the hash character "#"). As another example, the application may store the preview data in local data storage of the computing device, and may pass to the web view controller, similarly in a hash fragment for instance, a reference to (e.g., address of or other pointer to) the stored preview data. As still another example, after calling the web view controller, the application may receive a return request from the web view controller seeking the preview data, and the application may responsively return the preview data to the web view controller. Other examples are possible as well.

Continuing with reference to FIG. 2, at step 2B, the web view controller may then retrieve from data storage a cached version of the web view 26 and may incorporate the provided preview data into that cached version of the web view, so as to establish and render a preview view 28 of the web view, which the web view controller may present while the web view controller works to establish the full web view.

To facilitate establishing this preview view in an example implementation, the application will optimally have pre-cached into data storage of the computing device a web application that defines version 26 of the web view and that includes logic for receiving the provided preview data and incorporating that preview data into the web view. Such precaching can be done using techniques defined by HTML5 or other such versions of HTML, typically to facilitate offline access to a web application. For example, the application may call the web view controller as a background process, with a request for the web view controller to load the web application. In response, the web view controller may download from a server a manifest file that lists components of the web application to be cached, and the web view controller may then download and store the those components in data storage as an application cache or "AppCache" in association with the URI of the web application.

(In line with the discussion above, an advantage of using an embedded web view like this is that an application developer can readily update the web view. To do so, the application developer may simply post on the server a revised manifest file. The next time the web view controller seeks to load the web application, the web view controller may then call an update( ) function to check for any update to the manifest file and, seeing that the manifest file has changed, may then automatically download the new manifest file and any changed components of the web application.)

In practice, for instance, the cached web application may include an HTML document that defines a presentation structure of the web view, such as general placement of sections (e.g., <div> tags) with generic text, images, or the like. As shown in FIG. 2, for example, the HTML document may define a section 30 containing a generic hotel image such as the block letter "H", a section 32 for presenting preview data under the hotel image, and a section 34 providing field labels and spaces for presenting hotel-specific text (e.g., cost and other information that will appear in the full web view 14).

Furthermore, the cached web application may include JavaScript program code (e.g., included in the HTML document or externally referenced by the HTML document) that is executable by a processing unit (per the web view controller) to incorporate the provided preview data into the HTML document. For instance, if the application will provide the preview data in a hash fragment of the URI passed to the web view controller, the JavaScript may be written to access the hash property of the document (location.hash) so as to obtain the provided preview data. Further, if the hash fragment will provide a reference to the preview data stored locally, the JavaScript may be written to read the hash property and then access that storage location to obtain the preview data. Alternatively, if the application will provide the preview data in response to a request from web view controller, the JavaScript may be written to generate that request to the application and to receive the preview data in response. Advantageously, the JavaScript may be arranged to be executed automatically when the web view controller loads the HTML document.

The JavaScript or other logic of the cached web application may then optimally be arranged to incorporate the provided preview data in a particular manner into the HTML document. For instance, with the arrangement shown in FIG. 2, the JavaScript may be written to select the <div> tag of section 30 and to set the contents of the <div> tag equal to the hotel image provided by the preview data and/or some derivation of that image. Further, the JavaScript may be written to select the <div> tag of section 32 and to set the contents of the <div> tag equal to the text provided by the preview data and/or some derivation of that text. If the preview data provided by the application was the image of The Geneva Lodge and the text "The Geneva Lodge—Joe's Denver getaway!" as discussed above, the result may then be that the web view controller renders the preview view 28 shown in FIG. 2. In particular, the preview view includes the presentation structure defined by the cached web application, modified by including in sections 30 and 32 the preview data that the application provided when calling the webview controller.

In accordance with the method, the web view controller may render this preview view 28 for presentation to the user while the web view controller is working to establish the full web view 14. Advantageously, the preview view may thus serve as an intermediate presentation for the user, optimally one that was quickly presented based on the cached version of the web view and that incorporates the preview data provided locally by the calling application. As discussed above, presentation of this preview view may be particularly advantageous on a mobile communication device that has communication latency issues, since the preview view may quickly provide the user with relevant information to consider while the web view controller works in the background to establish the full web view.

To facilitate this in practice, the script logic of the cached web application may be executable to render the preview view and to concurrently (or just before or just after rendering the preview view) request relevant instance data from one or more web servers. For example, in the arrangement discussed above, the JavaScript may cause the web view controller to render the preview view 28 and then, as shown by arrow 36, to use AJAX to send (i) to a web server a GET request providing the user's hotel selection to the web server, (ii) to receive from the web server a set of result data, and (iii) to render that result data, as an update or replacement of part or all of the preview view 28, as the full web view 14. For instance, the web view controller may receive as the AJAX result data a set of offer details regarding the hotel, such as cost information, accommodation details, and offer dates. In accordance with the JavaScript, the web view controller may then set the contents of section 34 to be the received offer details. The web view controller may then render the resulting full web view 14 for presentation to the user, as shown at step 2C of FIG. 2.

In this example, the script logic would optimally cause the received instance data to seamlessly replace or fill in one or more elements of the preview view 28, so that the user will perceive a smooth transition from the preview view 28 to the full web view 14. In an alternative implementation, however, the script logic may instead cause a less seamless transition (or other type of transition) to occur. For instance, the logic may cause the web view controller to request the full web view indicated by the URI and to receive and render that full view as a replacement for the preview view, rather than altering the contents of the preview view.

Furthermore, in practice, the process of transitioning to present the full web view 14 may be additionally expedited by having the native application pre-authenticate the web application while the native view 12 is presented, before the user provides input that directs the web view controller to present the web view. Such pre-authentication may function to obtain in advance a secure token or the like that the web view controller may provide to a server to show that the user and/or computing device has the right to obtain the requested information. In practice, for instance, the native application may include logic (i) for detecting when a presented native view includes one or more objects (such as the actionable hotel links discussed above) that a user may select in order to invoke presentation of a web view, and (ii) for responding to detecting such object(s) by engaging in a pre-authentication process for the web application.

In an example implementation of the pre-authentication process, the native application may call an AccountManager process on the computing device, passing to the process a representation of a service to be authenticated, the web application URI, and a user-account object (per a user profile on the computing device for instance). The AccountManager process may then send a request to an account server, indicating the information provided by the native application, and may receive in response from the account server (i) a one-time use token for use to obtain necessary cookies and (ii) the web application URI, as a continue-URI for instance. In turn, the AccountManager may then return that data to the native application. When the native application then calls the web view controller to invoke presentation of the web view, the native application may then conveniently provide the received token so that the web view controller can readily obtain any necessary cookies. Alternatively, the native application may itself obtain the cookies in advance and may provide those cookies to the web view controller when calling the web view controller. Other arrangements are possible as well.

Figure 3:
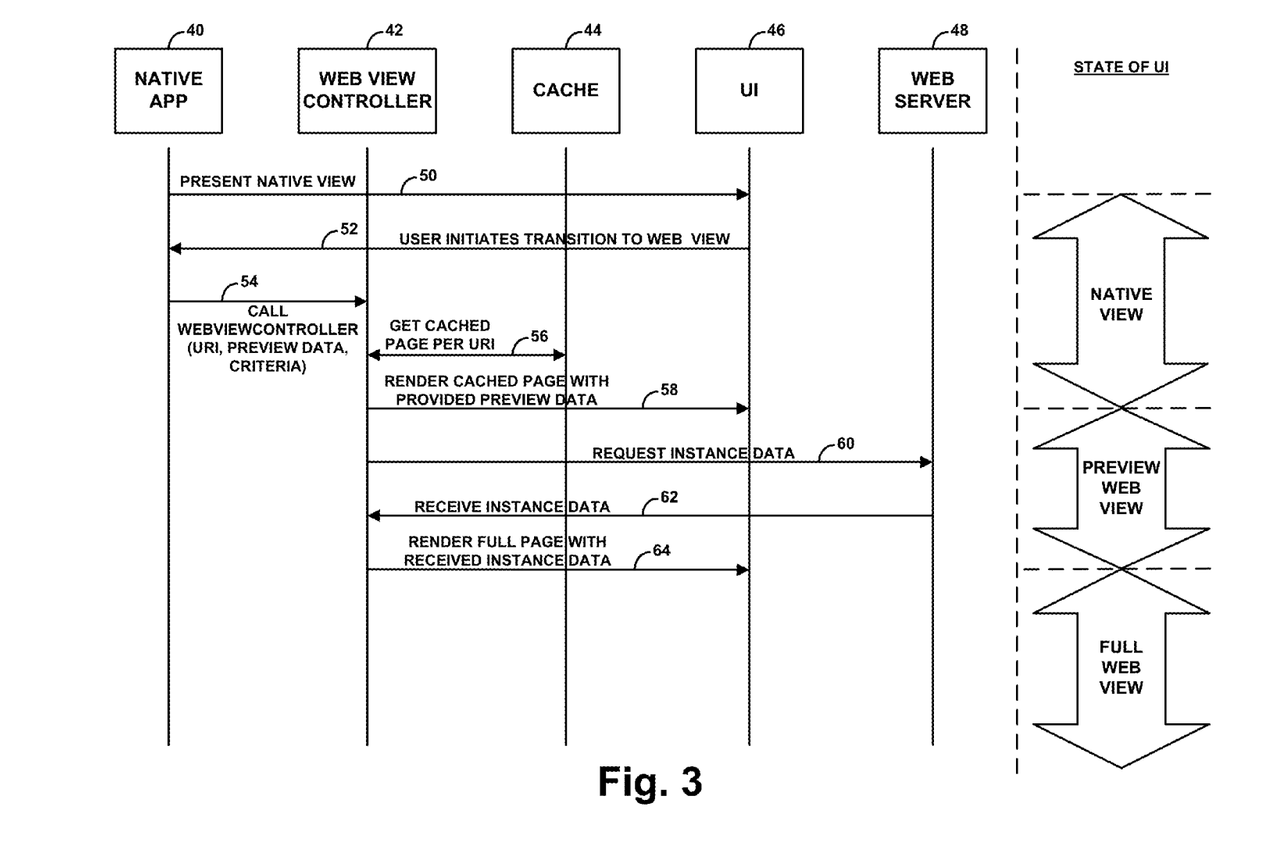
FIG. 3 is a process flow diagram depicting functions that may be carried out in accordance with an example method.

FIG. 3 is next a process flow diagram, illustrating the interaction between various components in accordance with an example implementation of the method. In particular, the figure depicts along its top a native application 40, an embedded web view controller 42, a cache (e.g., local data storage) 44, a user interface 46, and a web server 48. Further, the figure depicts an example sequence of functions carried out in the method, and the figure depicts at its right side the resulting state of the user interface 46 that a user may perceive.

As shown in the figure, at step 50, the method may begin with the native application 40 presenting a native view at the user interface 46. At step 52, the native application may then receive input representing user initiation, at the user interface, of a transition to present a web view. At step 54, in response to the user input, the native application may then call the web view controller 42, passing to the web view controller a URI of the requested web view, along with preview data and a reference to instance data (such as the hotel selection described above). At step 56, in response to the call from the native application, the web view controller may then retrieve from cache 44 the cached version of the web view having the associated URI. And at step 58, the web view controller may then incorporate the provided preview data into the retrieved version of the web view and render the resulting preview view at the user interface 46.

At step 60, which may alternatively occur before or concurrently with step 58, the web view controller may request applicable instance data from the web server 48. And at step 62, the web view controller may receive in response from the web server the requested instance data. At step 64, the web view controller may then establish a full web view, such as by incorporating the received instance data into the preview view for instance, and may render the full web view at the user interface 46.

As shown at the right side of the figure, the result of this example process is thus that (i) beginning at step 50, the user interface presents the native application view, (ii) upon user input initiating transition to a web view, at step 58, the user interface may quickly transition to present the preview view, and (iii) upon receipt by the web view controller of the applicable instance data, the user interface may then transition from presenting the preview view to presenting the full web view.

Figure 4:
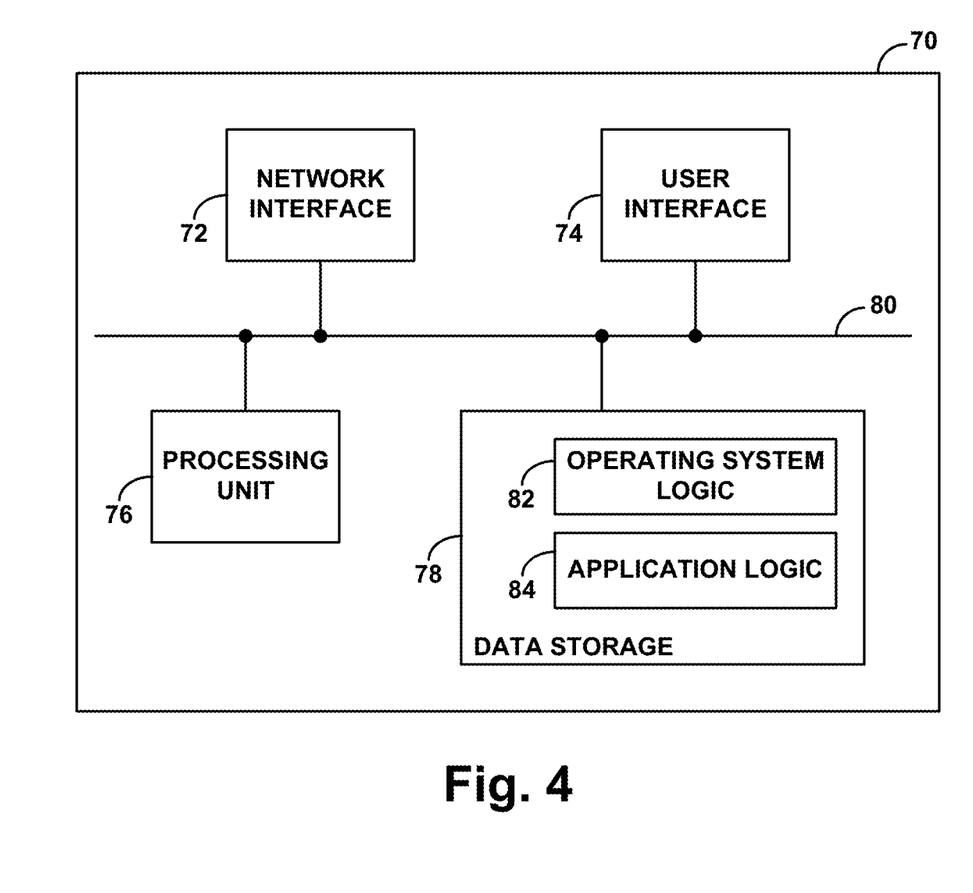
FIG. 4 is a simplified block diagram of an example computing device in which the method may be implemented.

Turning next to FIG. 4, a simplified block diagram of a representative computing device 70 is provided, to illustrate various components that the device may include. The computing device may take any of a variety of forms, examples of which include without limitation a cell phone, a tablet computer, a notebook computer, a desktop computer, a personal digital assistant, a gaming device, or any other types of device now known or later developed. As shown, the representative device 70 includes a network interface 72, a user interface 74, a processing unit 76, and data storage 78, all of which may be communicatively linked together by a system bus, network or other connection mechanism 80.

Network interface 72 may comprise a wired or wireless interface arranged to allow device 70 to communicate on a network (not shown) and with entities via that network 14, such as with a web server (not shown) for instance, and particularly to communicate data to and from the computing device. For example, the network interface may comprise a wired or wireless Ethernet interface for communication on a local area network and in turn via a router and/or one or more other network elements with entities on the Internet. As another example, the network interface may comprise a cellular wireless interface, arranged to engage in air interface communication with a radio access network according to a protocol such as LTE, WiMAX, CDMA, GSM, or the like, and via the radio access network with entities on the Internet. Other examples are possible as well.

User interface 74 may enable the device 70 to interact with a user of the device and may thus comprise output components such as a display screen, an audio speaker, and the like, and input components such as a keyboard, camera, touch-pad or touch-screen, and the like. In practice, the user interface may facilitate presentation to the user of the various views discussed above, and may function to receive from a user input of the type discussed above.

Processing unit 76 may comprise one or more general purpose processors (e.g., microprocessors) and/or one or more special purpose processors (e.g., application specific integrated circuits, digital signal processors, etc.) If processing unit 76 includes multiple processors, the processors may be arranged to work in combination (e.g., in parallel) or separately. Further, processing unit 76 may be integrated in whole or in part with network interface 72 or with one or more other components of the device.

Data storage 78 may then comprise one or more volatile and/or non-volatile storage components (non-transitory), such as magnetic, optical, flash, or other types of storage now known or later developed, and may be integrated in whole or in part with processing unit 76 and/or may be removable from the device 70 or externally connected (through wired or wireless means) with the device 70. As shown, data storage 78 contains operating system logic 82 and application logic 84 executable by the processing unit 76 to carry out various functions described herein.

Operating system logic 82 may manage hardware resources of the device 70 and provide common services, such as an application programming interface (API), for applications. Examples of such operating systems include, without limitation, ANDROID, iOS, LINUX, MAC OS X, WINDOWS, and WINDOWS PHONE.

Application logic 84, in turn, may include one or more native applications, such as the native application described above, which may be arranged to run on the operating system 82 and thus interact with hardware of the device through operating system 82. These native applications may be written in any of a variety of programming languages and compiled into instructions executable by processing unit 76. For instance, the native applications may be Java or Objective-C applications, or for that matter other types of applications that, when compiled, will interwork with the API of the operating system 82. Alternatively or additionally, the native applications may be defined by one or more markup documents, which can essentially be executed by being interpreted, rendered, or otherwise processed by processing unit 76, possibly through execution of one or more interpreters, such as browser applications.

Figure 5:
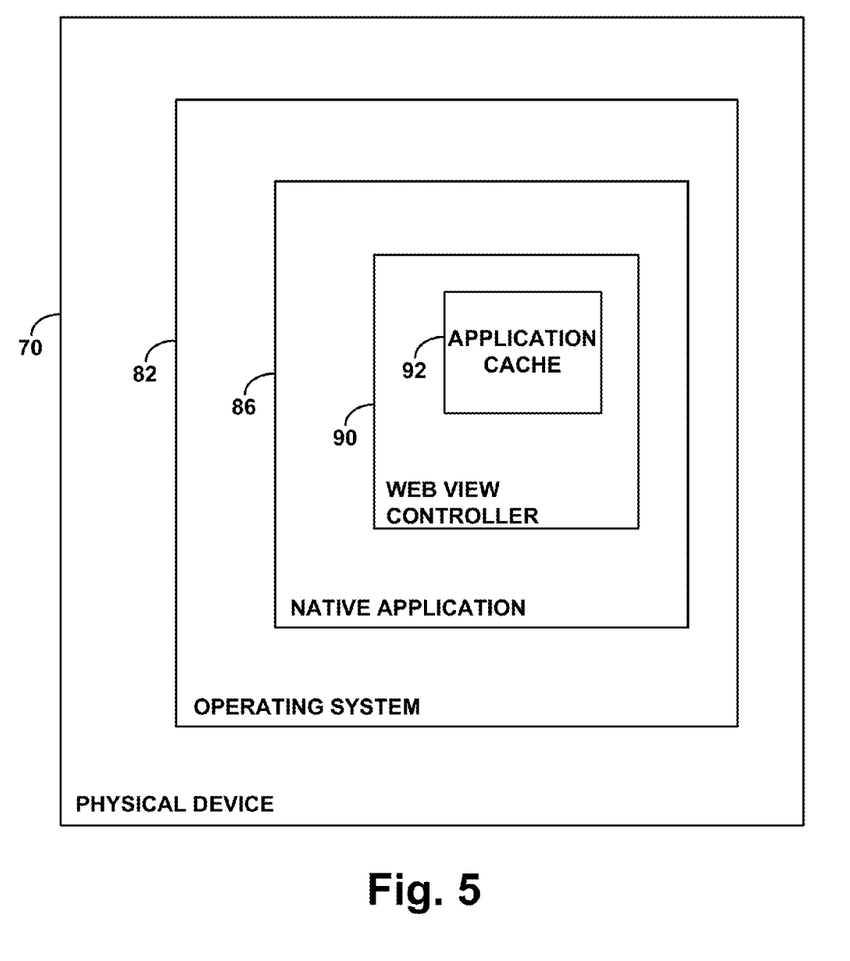
FIG. 5 is an illustration of application logic that may be stored within a representative computing device.

FIG. 5 next depicts a particular arrangement of application logic 84 including a native application 86 and an embedded web view controller 90, with the native application being arranged to call the web view controller to facilitate presentation of a web view as discussed above. In practice, the web view controller 90 may be defined by the operating system, and the native application may be written to incorporate an instance of the web view controller. In operation, the web view controller object may thus be considered an embedded part of the native application.

As illustrated in FIG. 5, the physical device 70 includes the operating system 82 (executable by the processing unit 76), the native application 86 is executed by the processing unit 76 within the operating system 82, and the web view controller 90 is executed by the processing unit within the native application 86. Further, as shown, the web view controller 90 has application cache 92, which optimally has preloaded a web application providing a version of the web view as discussed above. In particular, the web application may define a web page structure that the processing unit can render for presentation at the user interface 74.

In practice with this arrangement, the native application may be considered an example invoking application that is executable by the processing unit to invoke the web application and, when invoking the web application, to provide preview content to the web application. For instance, as discussed above, the native application may include one or more objects such as button 18 that, when selected, may cause the native application to call a web view controller and to pass to the web view controller a URI of the web application, as well as preview data that the web view controller (in accordance with the web application script logic) may incorporate into the cached version of the web view, so as to establish and render a preview view. In an alternative embodiment, the invoking application may take other forms. For instance, the invoking application may itself be a web application or the like or may take the form of other program logic, whether or not conventionally considered an "application".

With this arrangement, in line with the discussion above, the web application may define script logic executable by the processing unit upon the invocation of the web application (i) to receive the preview content provided by the invoking application, (ii) to incorporate the received preview content into the cached web page structure so as to establish a preview page renderable by the processing unit 76 for presentation at the user interface 74, (iii) to download, via the network interface 72, instance content for the web application while the preview page is being presented at the user interface, and (iv) upon receipt of the downloaded instance data, to establish, based on the instance data, an updated page (e.g., by incorporating the instance data into the cached web page structure) renderable by the processing unit for presentation at the user interface.

In practice, as discussed above, the native application (or other invoking application) may incorporate the web view controller 90 for running the web application. Further, the native application may be further executable by the processing unit 76 to provide a native application view for presentation at the user interface 74, in which case the act of invoking the web application may cause the processing unit to render the preview page for presentation at the user interface in place of the native application view. Moreover, as discussed above, the native application may be executable by the processing unit to pre-authenticate the web application before invoking the web application, for instance in response to presence in the native application view of at least one object selectable to trigger invocation of the web application.

Further in line with the discussion above, the act of invoking the web application may comprise calling the web view controller with a program call that passes a URI of the web application, and the web view controller may be executable by the processing unit to run the web application in response to the call passing the URI of the web application. In that case as well, the act of providing the preview content to the web application when invoking the web application may involve including the preview content in a hash fragment of the URI passed to the web view controller. Alternatively, as discussed above, the invoking application may receive from the web application (e.g., the web view controller, pursuant to the web application), upon invoking the web application, a request for the preview content, and the invoking application may then provide the preview content to the web application in response to the request. And still alternatively, the invoking application may store the preview content in the data storage and provide the web application (e.g., the web view controller) with a reference to the stored preview content, for the web application to retrieve the preview content from the data storage.

Still further, the URI that the invoking application passes to the web view controller may include a reference to the instance data, in which case the act of downloading the instance data may involve transmitting a web request that specifies the reference and receiving in response to the web request the instance data.

Figure 6:
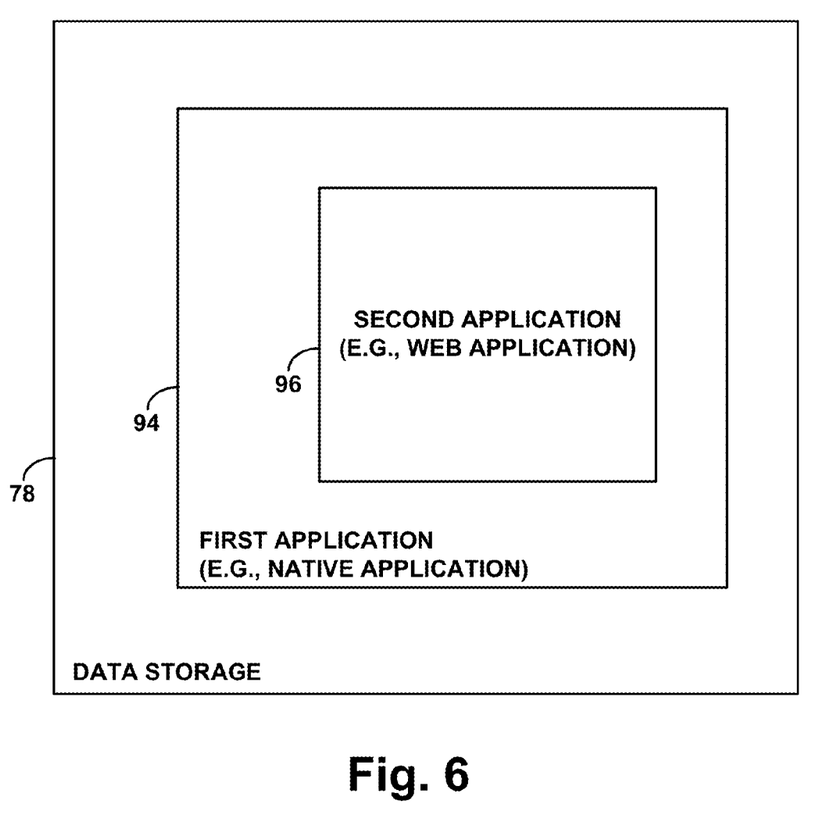
FIG. 6 is another illustration of application logic that may be stored within a representative computing device.

FIG. 6 is next another depiction of data storage 78 or another a computer readable medium that may have stored thereon program logic executable by a processing unit to carry out various functions described herein. As shown in this figure, the computer readable medium contains a first application 94 and a second application 96. In practice, for instance, the first application may be a native application, and the second application may be a web application. As shown by way of example, the second application may be embedded as a subsidiary part of the first application. Alternatively, the applications may more generally be separate sets of program logic.

In this arrangement, the first application may be executable by a processing unit to invoke the second application and, when invoking the second application, to provide the second application with preview content. Further, the second application may define an application view (e.g., web view) renderable by the processing unit for presentation at a user interface and may further define script logic executable by the processing unit (i) to receive the preview content provided by the first application when invoking the second application, (ii) to incorporate the preview content into the application view to produce a preview view renderable by the processing unit for presentation at the user interface, (iii) to download instance data via a network from a network server while the preview view is being presented at the user interface, and (iv) upon receipt of the downloaded instance data, to establish, based on the instance data, an updated view renderable by the processing unit for presentation at the user interface.

In line with the discussion above, the act of establishing the updated view based on the instance data may involve incorporating the instance data into the application view to establish the updated view, in which case the updated view may update or replace the preview view at the user interface.

Further, the first application may incorporate a view controller (e.g., a web view controller), in which case the act of invoking the second application may involve calling the view controller and, when calling the view controller, passing to the view controller a URI of the second application. Moreover, with such an arrangement, the act of providing the second application with the preview content may involve providing the preview content in the URI, or storing the preview content in data storage and providing the second application with a reference to the stored preview content, so that the second application can retrieve the preview content from the data storage. And additionally, the URI may include a reference to the instance data, in which case downloading the instance data may involve transmitting a web request specifying the reference and receiving in response to the web request the instance data.

In this arrangement, also in line with the discussion above, the first application may be executable by the processing unit to provide a first-application view for presentation at the user interface, in which case the preview view may replace the first-application view at the user interface. Further, the first application may be executable by the processing unit to pre-authenticate the second application before invoking the second application, such as in response to presence in the first-application view of at least one object selectable to trigger invocation of the second application.

Figure 7:
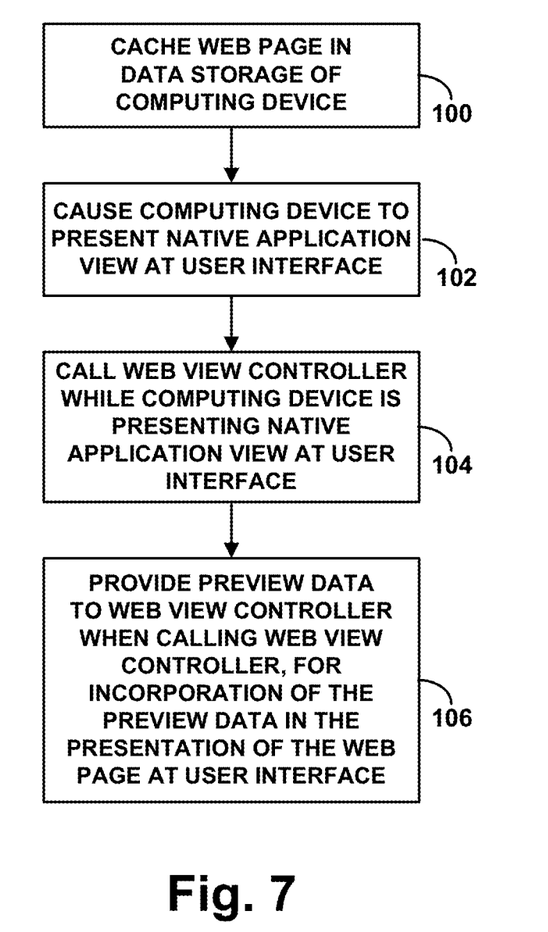
FIG. 7 is a flow chart depicting functions that may be carried out in accordance with an example method.

FIG. 7 is next a flow chart depicting functions that can be carried out in accordance with the present method. In practice, these functions may be functions of a native application stored on a non-transitory computer readable medium and executable by a processing unit such as processing unit 76.

As shown in FIG. 7, at block 100, the functions may include caching a web page in data storage of a computing device. In line with the discussion above, this caching may be done through execution of the native application, and particularly through execution of a web view controller and other components of the native application, and/or by other logic. Further, at block 102, the functions may include causing the computing device to present a native application view at a user interface. As discussed above, the native application may programmatically define or have stored this native application view and may thus readily present it. Further, although block 102 is shown after block 100, the caching of the web page in data storage may occur before or while the native application view is presented.

At block 104, the functions may include calling a web view controller while the computing device is presenting the native application view at the user interface. For instance, this function may include passing to the web view controller a URI of the web page to cause the web view controller to retrieve the web page from the data storage and to render the retrieved web page for presentation at the user interface.

Moreover, at block 106, the functions may include providing preview data to the web view controller, when calling the web view controller, for incorporation of the preview data in the presentation of the web page at the user interface. For instance, as discussed above, this may involve including the preview data in the URI or storing the preview data in the data storage and passing to the web view controller a reference to the stored preview data, such as by including the reference in the URI. And although not shown, the functions may additionally include pre-authenticating the web page before calling the web view controller, such as in response to detecting presence in the native application page of at least one object selectable to trigger presentation of the web page.

Further in line with the discussion above, the web page may optimally include script logic that is executable by the processing unit (i) to incorporate the provided preview data into the presentation of the web page at the user interface, (ii) to download, via a network interface of the computing device, instance data for the web page, while the web page with the incorporated preview data is presented at the user interface, and (iii) upon download of the instance data, to incorporate the instance data into the presentation of the web page at the user interface.

Figure 8:
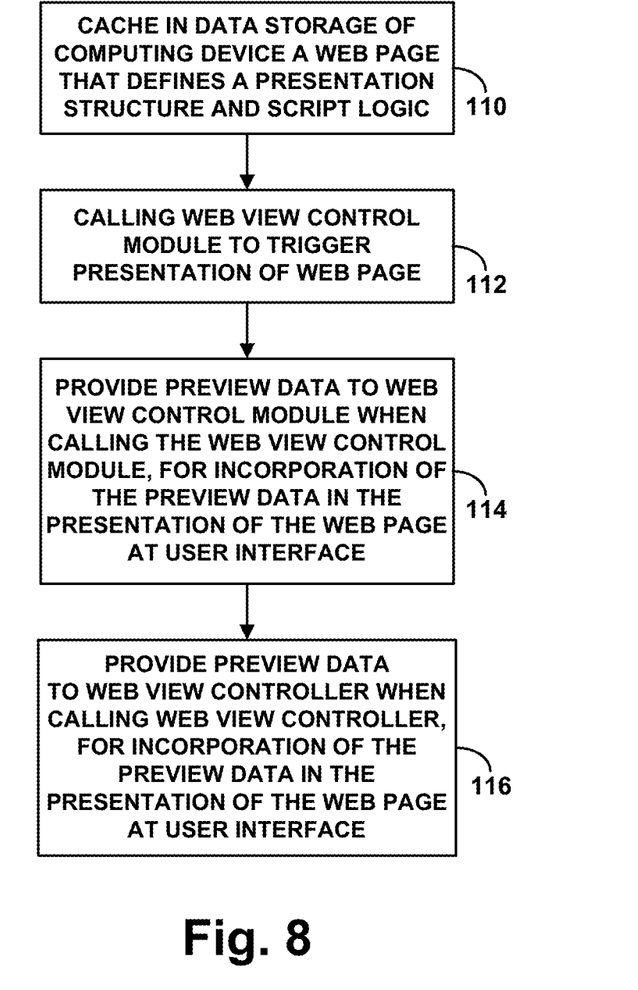
FIG. 8 is another flow chart depicting functions that may be carried out in accordance with an example method.

Finally, FIG. 8 is yet another flow chart depicting functions that can be carried out in accordance with the present method. In practice, for instance, these functions may be defined by program instructions stored on a non-transitory computer readable medium such as data storage 78 for instance, and may be executable by a processing unit as discussed above.

As shown in FIG. 8, at block 110, the method may include caching in data storage of a computing device a web page that defines a presentation structure and script logic. For instance, as discussed above, the web page may define the presentation structure through use of HTML or the like. Further, the web page may incorporate JavaScript or other such script logic executable by a processing unit.

At block 112, the method may then further include a processing unit calling a web view control module such as web view controller 90, to trigger presentation of the web page. In particular, the processing unit may execute a function call to call the web view control module, passing to the web view control module a URI of the web page, to cause the web view control module to retrieve the web page from the data storage and to render the retrieved web page for presentation at a user interface of the computing device.

Furthermore, at block 114, which may occur as part of block 112, the method may involve providing preview data to the web view control module, when calling the web view control module, for incorporation of the preview data in the presentation of the web page at the user interface. For instance, when calling the web view control module, the processing unit may include the preview data in the URI, or the processing unit may store the preview data storage of the computing device and may include in the URI a pointer or other reference to the stored preview data so that the web view control module can retrieve the preview data.

At block 116, the method may then involve the processing unit executing the script logic of the web page (i) to incorporate the provided preview data into the presentation of the web page at the user interface, (ii) to download, via a network interface of the computing device, instance data for the web page, while the web page with the incorporated preview data is presented at the user interface, and (iii) upon download of the instance data, to incorporate the instance data into the presentation of the web page at the user interface. In practice, for instance, the a reference to the instance data to be downloaded may be included in the URI. Further, the presentation of the web page incorporating the downloaded instance data may update or replace the presentation of the web page incorporating the preview data.

Although not shown, the method may also include the processing unit providing a native application view for presentation at the user interface, and the processing unit detecting that the native application view includes at least one object selectable by a user to trigger presentation of the web page and responsively authenticating the web page before calling the web view control module to trigger presentation of the web page, as discussed above.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

We claim:
1. A non-transitory computer readable medium having stored thereon a native application executable by a processing unit to carry out functions comprising:
caching a web page in data storage of a computing device;
causing the computing device to present a native application view at a user interface;
calling a web view controller while the computing device is presenting the native application view at the user interface;
providing preview data to the web view controller, when calling the web view controller, for incorporation of the preview data in a presentation of the web page at the user interface, wherein the web page as cached defines a web page presentation structure comprising general section placement and generic content; and
wherein calling the web view controller comprises passing to the web view controller a uniform resource identifier (URI) of the web page to cause the web view controller to retrieve the web page from the data storage and to render the retrieved web page, and wherein the web page includes script logic executable by the processing unit to incorporate the provided preview data into the presentation of the web page at the user interface;
wherein the script logic is further executable by the processing unit (i) to download, via a network interface of the computing device, instance data for the web page, while the web page with the incorporated preview data is presented at the user interface, and (ii) upon download of the instance data, to incorporate the instance data into the presentation of the web page at the user interface.

2. The non-transitory computer readable medium of claim 1, wherein providing the preview data to the web view controller when calling the web view controller comprises including the preview data in the URI.

3. The non-transitory computer readable medium of claim 1, wherein providing the preview data to the web view controller when calling the web view controller comprises storing the preview data in the data storage and passing to the web view controller a reference to the stored preview data.

4. The non-transitory computer readable medium of claim 3, wherein passing to the web view controller the reference to the stored preview data comprises including the reference in the URI.

5. The non-transitory computer readable medium of claim 1, wherein the functions further comprise pre-authenticating the web page before calling the web view controller, the pre-authenticating being done in response to detecting presence in the native application page of at least one object selectable to trigger presentation of the web page.

6. A non-transitory computer readable medium having stored thereon a first application and a second application,
the first application being executable by a processing unit to invoke the second application and, when invoking the second application, to provide the second application with preview content, and
the second application defining an application view renderable by the processing unit for presentation at a user interface and further defining script logic executable by the processing unit (i) to receive the preview content provided by the first application when invoking the second application, (ii) to incorporate the preview content into the application view to produce a preview view renderable by the processing unit for presentation at the user interface, (iii) to download instance data via a network from a network server while the preview view is being presented at the user interface, and (iv) upon receipt of the downloaded instance data, to establish, based on the instance data, an updated view renderable by the processing unit for presentation at the user interface.

7. The non-transitory computer readable medium of claim 6, wherein establishing the updated view based on the instance data comprises incorporating the instance data into the application view to establish the updated view, the updated view updating or replacing the preview view at the user interface.

8. The non-transitory computer readable medium claim 6, wherein the first application incorporates a view controller, wherein invoking the second application comprises calling the view controller and, when calling the view controller, passing to the view controller a uniform resource identifier (URI) of the second application.

9. The non-transitory computer readable medium of claim 8, wherein providing the second application with the preview content comprises providing the preview content in the URI.

10. The non-transitory computer readable medium of claim 8, wherein the URI includes a reference to the instance data, and wherein downloading the instance data comprises transmitting a web request specifying the reference and receiving in response to the web request the instance data.

11. The non-transitory computer readable medium of claim 6, wherein the first application is further executable by the processing unit to provide a first-application view for presentation at the user interface, wherein the preview view replaces the first-application view at the user interface.

12. The non-transitory computer readable medium of claim 6, wherein the first application is further executable by the processing unit to pre-authenticate the second application before invoking the second application, in response to presence in the first-application view of at least one object selectable to trigger invocation of the second application.

13. The non-transitory computer readable medium of claim 6, wherein providing the second application with the preview content when invoking the second application comprises:
storing the preview content in data storage, and providing the second application with a reference to the stored preview content, for retrieval of the preview content by the second application from the data storage.

14. The non-transitory computer readable medium of claim 6, wherein the first application is a native application and the second application is a web application.

15. A computing device comprising:
a network interface for communicating data to and from the computing device;
a user interface;
a processing unit;
data storage;
a web application cached in the data storage, wherein the web application defines a cached web page structure renderable by the processing unit for presentation at the user interface; and
an invoking application stored in the data storage and executable by the processing unit to invoke the web application and, when invoking the web application, to provide preview content to the web application, wherein the cached web page structure comprises general section placement and generic content,
wherein the web application further defines script logic executable by the processing unit upon the invocation of the web application (i) to receive the preview content provided by the invoking application, (ii) to incorporate the received preview content into the cached web page structure so as to establish a preview page renderable by the processing unit for presentation at the user interface, (iii) to download, via the network interface, instance content for the web application while the preview page is being presented at the user interface, and (iv) upon receipt of the downloaded instance data, to establish, based on the instance data, an updated page renderable by the processing unit for presentation at the user interface.

16. The computing device of claim 15, wherein establishing the updated page based on the instance data comprises incorporating the instance data into the cached web page structure.

17. The computing device of claim 15, wherein the invoking application incorporates a web view controller for running the web application.

18. The computing device of claim 17, wherein the invoking application comprises a native application.

19. The computing device of claim 18, wherein the native application is further executable by the processing unit to provide a native application view for presentation at the user interface, and wherein invoking the web application causes the processing unit to render the preview page for presentation at the user interface in place of the native application view.

20. The computing device of claim 18, wherein the native application is further executable by the processing unit to pre-authenticate the web application before invoking the web application, in response to presence in the native application view of at least one object selectable to trigger invocation of the web application.

21. The computing device of claim 17,
wherein invoking the web application comprises calling the web view controller with a program call that passes a uniform resource identifier (URI) of the web application, the web view controller being executable by the processing unit to run the web application in response to the call passing the URI of the web application, and
wherein providing the preview content to the web application when invoking the web application comprises including the preview content in a hash fragment of the URI passed to the web view controller.

22. The computing device of claim 21, wherein the URI includes a reference to the instance data, and wherein downloading the instance data comprises transmitting a web request specifying the reference and receiving in response to the web request the instance data.

23. The computing device of claim 15, wherein providing the preview content to the web application when invoking the web application comprises:
upon invoking the web application, receiving from the web application a request for the preview content, and providing the preview content to the web application in response to the request.

24. The computing device of claim 15, wherein providing the preview content to the web application when invoking the web application comprises:
storing the preview content in the data storage, and providing the web application with a reference to the stored preview content, for retrieval of the preview content by the web application from the data storage.

25. A method comprising:
caching a web page in data storage of a computing device, wherein the web page defines a presentation structure and script logic;
calling by a processing unit a web view control module and providing preview data to the web view control module when calling the web view control module, to trigger presentation of the web page incorporating the provided preview data, wherein the web page as cached defines a web page presentation structure comprising general section placement and generic content, wherein calling the web view control module includes passing to the web view control module a uniform resource identifier (URI) of the web page, to cause the web view control module to retrieve the web page from the data storage and to render the retrieved web page for presentation at a user interface of the computing device, and wherein the processing unit executes the script logic of the web page to incorporate the provided preview data into the presentation of the web page at the user interface; and
executing by the processing unit the script logic of the web page (i) to download, via a network interface of the computing device, instance data for the web page, while the web page with the incorporated preview data is presented at the user interface, and (ii) upon download of the instance data, to incorporate the instance data into the presentation of the web page at the user interface.

26. The method of claim 25, further comprising:
providing by the processing unit a native application view for presentation at the user interface;
detecting by the processing unit that the native application view includes at least one object selectable by a user to trigger presentation of the web page;
responsive to the detecting, authenticating the web page before calling the web view control module to trigger presentation of the web page.

27. The method of claim 25, wherein the presentation of the web page incorporating the instance data updates or replaces the presentation of the web page incorporating the preview data.

28. The method of claim 25, wherein providing the preview data to the web view control module when calling the web view control module comprises including the preview data in the URI.

29. The method of claim 25, wherein providing the preview data to the web view control module when calling the web view control module comprises locally storing the preview data and including in the URI a reference to the locally stored preview data.

30. The method of claim 25, further comprising including in the URI a reference to the instance data to be downloaded.

* * * * *